United States Patent [19]

Brogdon

[11] Patent Number: 4,632,072
[45] Date of Patent: Dec. 30, 1986

[54] LOW VIBRATION ENGINE CONSTRUCTION

[75] Inventor: William Brogdon, Daphne, Ala.

[73] Assignee: Teledyne Industries, Inc., Los Angeles, Calif.

[21] Appl. No.: 677,388

[22] Filed: Dec. 3, 1984

[51] Int. Cl.⁴ .............................................. F02B 75/06
[52] U.S. Cl. ................................ 123/56 R; 123/192 B; 74/603
[58] Field of Search ............. 123/56 R, 56 A, 56 AA, 123/56 B, 56 BA, 56 AC, 192 B, 192 R; 74/603, 604

[56] References Cited

U.S. PATENT DOCUMENTS

| | | | |
|---|---|---|---|
| 877,294 | 1/1908 | Chase et al. | 123/56 AC |
| 1,840,220 | 1/1932 | Brewer | 123/56 AC |
| 1,855,570 | 4/1932 | Edison | 74/604 |
| 2,304,892 | 12/1942 | Dickson | 74/604 |
| 2,807,249 | 9/1957 | Peras | 123/192 B |
| 3,402,707 | 9/1968 | Heron | 123/192 B |
| 3,415,237 | 12/1968 | Harkness | 74/604 |
| 3,520,285 | 7/1970 | Klauder | 123/192 B |
| 3,581,628 | 6/1971 | Williams | 123/192 R |
| 3,667,317 | 6/1972 | Hillingrathner | 123/192 B |

FOREIGN PATENT DOCUMENTS

| | | | |
|---|---|---|---|
| 635167 | 4/1950 | United Kingdom | 123/56 AC |
| 651893 | 4/1951 | United Kingdom | 123/192 B |

Primary Examiner—Craig R. Feinberg
Assistant Examiner—David A. Okonsky
Attorney, Agent, or Firm—Gifford, Groh, VanOphem, Sheridan, Sprinkle & Dolgorukov

[57] ABSTRACT

The present invention provided a balancing arrangement for an eight cylinder horizontally opposed internal combustion engine construction having a housing and a four throw crank shaft rotatably mounted within the housing. A pinion is coaxially attached to each axial end of the housing and includes a counterweight radially spaced from the axis of rotation of the crank shaft. At least one idler pinion is rotatably mounted to the housing and in mesh with each crank shaft pinion and each idler pinion includes a weighted portion radially spaced from its axis of rotation. Both the counter weights and the weighted portions of the idler pinions are angularly spaced from each other by a predetermined amount so that, during rotation of the crank shaft, the centrifugal force vectors of the crank shaft counterweight and idler pinion weighted portions cancel the primary moment generated by the piston reciprocation acting on axially spaced positions along the crank shaft.

11 Claims, 2 Drawing Figures

LOW VIBRATION ENGINE CONSTRUCTION

BACKGROUND OF THE INVENTION

I. Field of the Invention

The present invention relates to internal combustion engines and, more particularly, to an eight cylinder horizontally opposed internal combustion engine with a four throw crank shaft having means to reduce engine vibration.

II. Description of the Prior Art

Horizontally opposed internal combustion engines conventionally include an elongated crank shaft which is rotatably mounted within the engine housing. This crank shaft includes a number of crank pins which are radially spaced from the axis of the rotation of the crank shaft for attachment to the piston connecting rods.

The previously known horizontally opposed engines, and particularly eight cylinder engines with four throw crank shafts, are typically balanced for the primary shaking force caused by the engine combustion and piston reciprocation. Conversely, these engines are unbalanced for the yawing couple or moment generated by the rotation of the crank shaft. This yawing couple is generated by the reciprocation of the opposed pistons in opposite directions. Although the pistons exert an equal force in opposite directions on the crank shaft, thus balancing the shaking force, these forces are exerted on the crank shaft at axially spaced positions, thus creating a yawing couple which, in effect, exerts a twisting force on the crank shaft about an axis perpendicular to its rotational axis and causes engine vibration. This yawing couple can be internally balanced for twelve and sixteen cylinder opposed piston engines, but cannot be internally balanced for eight cyinder opposed piston engines having a four throw crank shaft. In such engines, two aligned pistons share a common crank shaft throw.

SUMMARY OF THE PRESENT INVENTION

The present invention provides a balancing arrangement for an eight cylinder opposed engine with a four throw crank shaft which overcomes all of the above-mentioned disadvantages of the previously known devices.

In brief, the engine includes a housing with eight horizontally opposed pistons and cylinders and an elongated four throw crank shaft which is rotatably mounted within the housing. A pinion is axially secured to both the front end and the rear end of the crank shaft and both the front and rear crank shaft pinions include a counter weight at a position radially spaced from the axis of the pinion.

At least one idler gear is rotatably mounted to the housing so that it is in mesh with and in the same plane as the front crank shaft pinion. Similarly, a second idler gear is rotatably mounted to the engine housing in the same plane as, and in mesh with, the rear crank shaft pinion. Both idler gears, furthermore, include a weighted portion at a position radially spaced from their axes of rotation.

During the rotation of the crank shaft, both the counter weights, as well as the weighted portions of the idler gears, produce centrifugal forces in the plane of the engine cylinders. Furthermore, the counter weights on the crank shaft pinions, as well as the weighted portions on the idler gears, are angularly spaced with respect to each other so that their centrifugal force cancels the moment generated by the rotation of the crank shaft, thereby reducing engine vibration.

If desired, either one or two idler gears can be rotatably mounted to the engine housing and in mesh with either the front crank shaft pinion and/or the rear crank shaft pinion. In the event that two idler gears are employed with either or both of the crank shaft pinions, the weight of the weighted portion on the idler gears is adjusted appropriately to cancel the centrifugal force produced by the crank shaft rotation.

BRIEF DESCRIPTION OF THE DRAWING

A better understanding of the present invention will be had upon reference to the following detailed description when read in conjunction with the accompanying drawings, wherin like reference characters refer to like parts throughout the several views, and in which.

DETAILED DESCRIPTION OF A PREFERRED EMBODIMENT OF THE PRESENT INVENTION

Figure 1:
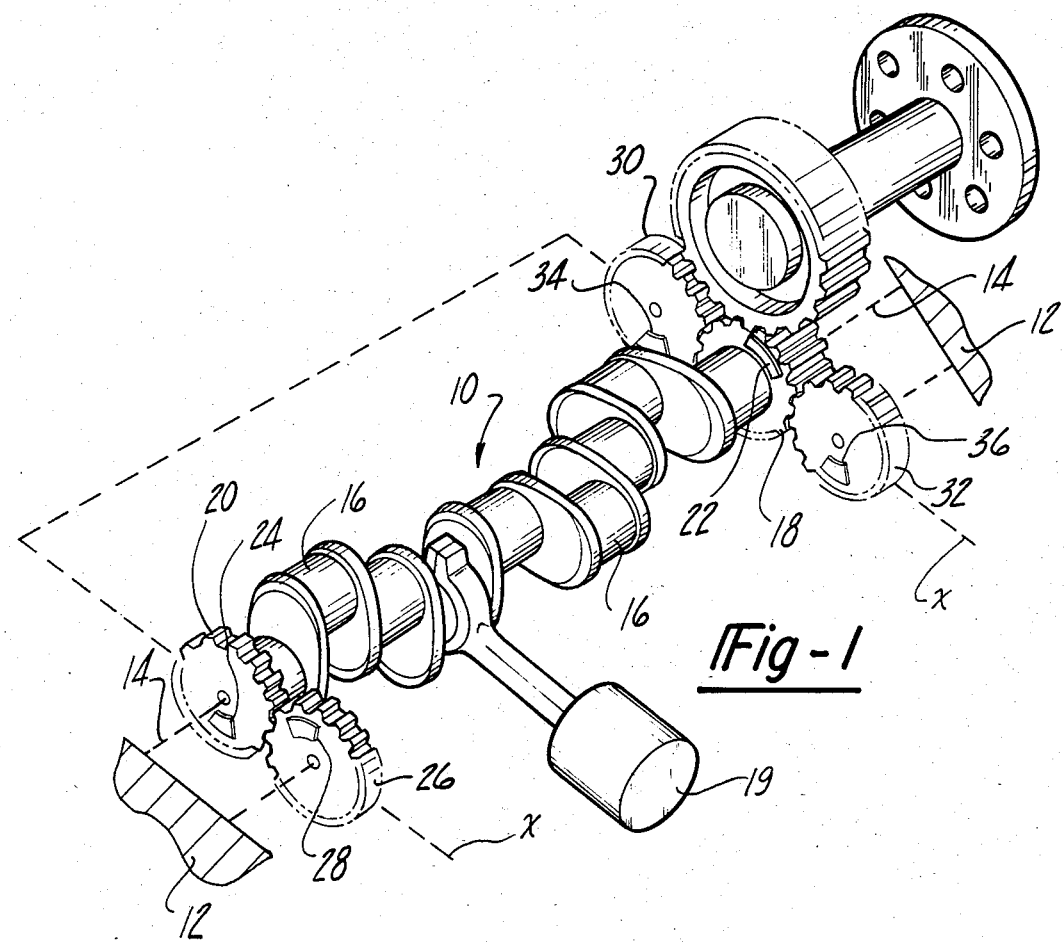
FIG. 1 is a perspective view illustrating a preferred embodiment of the present invention and with parts removed for clarity.

With reference first to FIG. 1, a preferred embodiment of the present invention is thereshown and comprises an elongated crank shaft 10 which is rotatably mounted to an engine housing 12 around a predetermined axis 14. The crank shaft 10 is conventional in construction for an eight cylinder opposed piston engine with a four throw crank shaft, and therefore, includes four crank pins 16 which are radially offset from the crank shaft axis 14. Two opposed pistons 19 (only one shown) are mechanically connected to each crank pin 16, and these pistons lie in the same, predetermined plane.

A first crank shaft pinion 18 is coaxially connected to the front of the crank shaft 10 and thus rotates in unison with the crank shaft 10. Similarly, a rear crank shaft pinion 20 is coaxially secured to the rear end of the crank shaft 10 and also rotates in unison with the crank shaft 10. The crank shaft pinions 18 and 20 each include a counter weight 22 and 24, respectively, at a position spaced radially from their axis of rotation and for a purpose to be subsequently described. The counter weights 22 and 24 are substantially equal in balance moment to each other.

Still referring to FIG. 1, a rear idler member or gear 26 is rotatably mounted to the engine housing 12 so that the gear 26 lies in the same plane as, and is in mesh with, the rear crank shaft pinion 20. The rear idler gear includes a weighted portion 28 equal in weight to the counter weight 24 at a radially spaced position from its axis.

Similarly, a pair of front idler members or gears 30 and 32 are also rotatably mounted to the engine housing 12 so that the idler gears 30 and 32 lie in the same plane as, and are in mesh with, the front crank shaft pinion 18. Each idler gear 30 and 32 includes a weighted portion 34 and 36, respectively, at a position radially spaced from its axis. The weighted portions 34 and 36, together, are substantially equal in balance moment to the counterweight 22.

Figure 2:
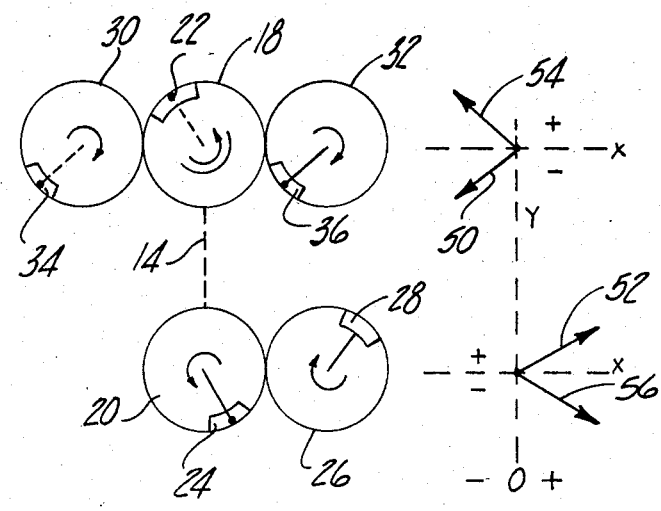
FIG. 2 is a diagrammatic view illustrating the operation of the present invention.

With reference now to FIG. 2, the crank shaft pinions 18 and 20 as well as the idler gears 26, 30 and 32 are thereshown diagrammatically and with the crank shaft pinions 18 and 20 rotating in a counterclockwise direction. The counterclockwise rotation of the crank shaft pinions 18 and 20 in turn rotatably drive the idler gears 26, 30 and 32 in the clockwise direction. In addition, the axes of the pinions 18 and 20 and the axes of the idler gears 26, 30 and 32 all lie in the predetermined plane.

The counter weights 22 and 24 on the crank shaft pinions are diammetrically opposed from each other and produce centrifugal force vectors 54 and 56, respectively, which are equal in magnitude but opposite in direction from each other. Similarly, the weighted portions 34 and 36 are angularly spaced with respect to the front crank shaft pinion 18 to produce a centrifugal force vector as shown at 50 while the weighted portion 28 on the rear idler gear 26 produces a force vector 52 which is equal in magnitude, but opposite in direction, from the force vector 50.

The force vectors 50 and 54 as well as 52 and 56 combine to produce a net force only in the plane of the engine piston and cylinders or along the x axis as viewed in FIG. 2. However, since the force represented by force vectors 50 and 54 is axially spaced from the force represented by the force vectors 52 and 56, these force vectors 50–56 impose a couple on the crank shaft 10.

The weighted portions 28, 34 and 36 and counter weights 24 and 22 are not only angularly spaced from each other so that they impose forces on the crank shaft 10 only in the plane x of the pistons, but are also angularly spaced with respect to the crank pins 16 so that they offset or cancel the primary or yawing couple generated by the piston reciprocation acting on the crank shaft. The angular relationship between the counterweights 22 and 24 and weighted portions 28, 34 and 36 and the crank pins 16 will vary depending upon the crank shaft configuration, but its relationship can be easily determined by one having ordinary skill in the art; see Internal Combustion Engines, Taylor, Vol. 2, p. 257.

Although the present invention has been described as having two idler gears 30 and 32 in mesh with the front crank shaft pinion 18 and a single idler gear 26 in mesh with the rear crank shaft pinion 20, one or more idler gears can be used with either or both of the crank shaft pinions 18 and 20 without deviation from the spirit or scope of the present invention. Rather, it is only necessary that the centrifugal forces produced by the idler gear or gears at one end of the crank shaft are equal in magnitude, but opposite in direction to, the centrifugal force produced by the idler gear or gears at the opposite end of the crank shaft and that the weights are properly angularly spacd with respect to the crank pins.

Likewise, although in the preferred embodiment, the crank shaft pinions and idler gears are mounted on the opposite axial ends of the crank shaft, they may be positioned at intermediate positions along the crank shaft 10, or axially spaced from the crank shaft 10, as long as at least one crank shaft pinion and idler gear 32 are axially spaced from a corresponding pair of a crank shaft pinion and its idler gear.

Having described my invention, however, many modifications thereto will become apparent to those skilled in the art to which it pertains without deviation from the spirit of the invention as defined by the scope of the appended claims.

We claim:

1. For use with an opposed eight piston engine having a housing, said pistons lying in a predetermined plane, an elongated crank shaft rotatably mounted in the housing, said crank shaft having four crank pins, a balancing arrangement for offsetting the primary couple imposed on the crank shaft by the piston reciprocation comprising:

a first counter weight attached to the crank shaft at a first predetermined angular position with respect to the crank pins of said crank shaft so that upon rotation of the crank shaft, said first counter weight rotates in a first plane, a second counter weight attached to the crank shaft at a second predetermined angular position with respect to the crank pins of said crank shaft so that, upon rotation of the crank shaft, said second counter weight rotates in a second plane, said counter weights being axially spaced from each other, a first idler means, means for rotatably mounting said first idler means to said housing in a plane substantially coplanar with said first plane, a second idler means, means for rotatably mounting said second idler means to said housing in a plane substantially coplanar with said second plane, means for rotatably driving said idler means in synchronism with said crank shaft, wherein each of said idler means includes a weighted portion offset from its axis of rotation and at a predetermined angular position with respect to each other and to the crank shaft so that, upon rotation of said crank shaft, the magnitude of centrifugal force of said first counter weight and said first idler means is substantially equal to, but opposite in direction from, the centrifugal force of said second counter weight and said second idler means, said centrifugal forces lying in said predetermined plane, and wherein said weighted portions and counter weights are angularly spaced with respect to said crank pins so that the couple generated by said centrifugal forces substantially offsets the primary couple.

2. The invention as defined in claim 1 wherein said counter weights are secured to opposite axial ends of said crank shaft.

3. The invention as defined in claim 1 wherein said driving means comprises means for driving said idler means in the opposite rotational direction from said counter weights.

4. The invention as defined in claim 1 wherein said first idler means comprises a pair of wheels, each wheel having a weighted area equal to substantially one half the balance moment of said weight portion.

5. The invention as defined in claim 1 wherein the first idler means comprises a single idler member.

6. The invention as defined in claim 1 wherein the second idler means comprises a single idler member.

7. The invention as defined in claim 1 wherein said first and second counter weights are angularly spaced by substantially 180 degrees.

8. The invention as defined in claim 7 wherein said weighted portions of said idler means are angularly spaced by substantially 180 degrees.

9. The invention as defined in claim 1 wherein each counter weight is associated with a pinion.

10. The invention as defined in claim 9 wherein each idler means comprises at least one gear in mesh with its respective pinion.

11. The invention as defined in claim 9 wherein a rotational axis of each of said pinions and said idler means all lie in said predetermined plane.

* * * * *